United States Patent Office 3,476,854
Patented Nov. 4, 1969

3,476,854
ANTIFUNGAL RESINOUS DENTAL COM-
POSITIONS AND ARTICLES
Eugene J. Molnar, La Grange, Ill., assignor to Coe Laboratories, Incorporated, Chicago, Ill., a corporation of Illinois
No Drawing. Filed Aug. 8, 1966, Ser. No. 570,726
Int. Cl. A61k 9/00; A01n 9/00; C08f 45/54
U.S. Cl. 424—78                           7 Claims This invention relates to dental plastic compositions and packaged articles thereof which are particularly adapted for application to dentures.

It is not uncommon to find in users of dental prosthesis a condition called "denture sore mouth" as descriped by Cahn, L. R., 1937, Ann. Dentist., 3, 33. The causes of the condition are multiple, but there are two principal factors, namely, 1. trauma caused by misfit of the prosthesis and 2. infection in which a yeast is believed to be the principal factor. Dental researchers have extensively considered the question of infection, for example, Bartels, H. A., 1937, Amer. J. Orthodont. 23, 90; Lyon, D. G. Chick, A. O. , 1957, Dent. Practit., 7 212; Reither, W., 1959; Deutsh. Zahnar. Ztsch., 14 705; Cawson, R. A., 1963, Brit. Dent. Jour., 115, 441 and, 1965, Dent. Practit., 15, 361; and Turrell, A. J. W., 1966, Brit. Dent. Jour., 120, 542.

Such researchers introduced treatments for symptoms which had developed, but there was no suggestion to prevent the growth of the responsible fungus by modifying tissue contacting materials on the denture itself. The art has recognized that inflammed irritated mouth tissue must be protected against further irritation in order to heal, and the use of cushions, or tissue conditioners, for such dentures has been employed as one of the popular methods for this purpose. Such cushions may include non-plastic wax gauze liners such as shown in U.S. 3,203,097. The use of soft plastic has, however, attained popular use such as alkyl methacrylates which are converted into a firm gel by appropriate solvents and plasticizers. Such a cushion is applied on the portion of the denture normally in contact with the irritated mouth tissue. The applied plastic cushion follows the contour of the mouth after inserting the denture and engaging the mouth tissue with the biscous but still deformable plastic applied to the denture. After a few minutes the denture with the formed cushion is removed, cleaned by removing excess material, and then the user can use the denture until healing is complete.

Another popular use of plastics in dentures is that of an elastomeric liner which can be used to actually correct an ill fitting denture. An elastomeric plastic is applied to a denture to give more comfort to the wearer. Such plastic liners are stronger and can be used for extended periods as distinguished from the cushion, more properly referred to as a tissue conditioner, which has a shorter useful life. The most popular elastomeric plastic resins are plasticized methacrylates, plasticized vinyl copolymers, and the silicone resins which can be cured by recognized agents.

A problem which is not recent but which occurs more often with the widespread use of plastic tissue conditioners and liners is that of fungal growth. The principal pathologic fungus is Candida albicans, and it grows on mouth tissue associated with or contacting the denture. Such growth also occurs on the dental prosthesis and even within such prosthetic material. The growth of such fungus may occur on hard rubber and on rigid plastics as reported by the dental researcher, Lelkes, K., 1957, Oster. Zeitsch. Stom., 53, 243; however, such growth shows a higher incidence relative to the pliable plastics used as tissue conditioners or liners.

It is desirable to provide means which would successfully retard germ growth in the mouth because it is a potential hazard. Fuchs, P., 1966, Deutsch, Zahner, Ztsch, 21, 163, recognized the value of using such soft plastics in dentures, but was aware generally of the hazards of germ infection. Candida albican is a common yeast-like fungus which is a normal inhabitant of the mouth but which growth can threaten the well-being of the human. The problem has become more serious with the widespread use of antibiotics since Candida albicans is notorious for undergoing enhanced growth with the use of most antibiotics. It is required that such growth retarding means be effective and not otherwise render the use of the denture piece a disadvantage, particularly its liner or cushion. It is preferred that such means be substantially water insoluble so that the water content of saliva and the materials dissolved therein do not invade the plastic liner or cushion following a leaching out of the means employed to retard said fungal growth.

It, is, therefore, an object of this invention to provide a plastic composition adapted to be applied to dentures for long use, which plastic composition can resist fungal growth without losing its advantages as a suitable material for application to dentures.

Another object is a firm gel plastic composition adapted to be used as a cushion or tissue conditioner for dentures, and which cushion can be used without allowing fungal growth hazardous to the human organism.

Another object is a plastic composition which can be used as a liner for dentures, and which liner can be used for extensive periods of time without permitting fungal growth hazardous to the human organism.

Another object is a plastic composition sufficently pliable for use in dentures, but which pliability does not lead to expected fungal growth which could be inimical to the human.

Another object is a packaged plastic composition suitable to processing an application to dentures wherein particularly adaptable means for retarding fungal growth are incorporated in amounts sufficient to process the plastic composition to effectively retard such fungal growth.

Another object is a packaged plastic composition suitable for processing as a liner to dentures in which an elastomeric resin is present with sufficient amounts of curing agent and sufficient amounts of material to inhibit fungal growth when the materials of the package are combined and processed for application as a liner to a denture. The foregoing objects are attained as well as other objects which will become apparent from considering the following disclosure.

The plastic compositions which are applied to dentures are soft, pliable, and non-toxic and have no offensive taste. These plastics are either in the form of a soft gel which provide the desirable cushion, or are more durable elastomerics which operate as a liner over extended periods. Both these types of plastics are resilient although the elastomeric is firmer and more durable than the gel used for cushioning. It has been found that such resilient plastics can be processed to retard fungal growth, especially the dangerous Candida albicans, by dispersing throughout such plastic a small but effective amount of an antifungal agent which has advantageous characteristics which permit the applied plastic on the denture to be serviceable without detracting from such serviceability. Particular antifungal agents which have been found to successfully retard such fungal growth, and which have further been found not to adversely affect the operability of such plastic compositions, are the heavy metal salts of monocarboxylic acids, the lower and medium length carbon chains of monocarboxylic fatty acids, benzoic and salicylic acids, and esters thereof. The heavy metal salts include the zinc and copper salts. The monocarboxylic fatty acids include such as propionic, caprylic, capric undecylic and undecylenic. Zinc and copper are good antifungal agents, therefore, non-toxic zinc and copper compounds may be used.

Some of these materials may have been known to possess fungicidal properties, but the use thereof was never suggested in relation to denture tissue conditioners and liners; and the seriousness of such problems was never appreciated in its fullest context. The foregoing agents may be used alone or in various combinations. They may be handled in various ways because some are liquids at room temperature and others are solids. In particular, zinc or copper undecylenates have been found to operate to advantage. Reference will frequently be made herein to zinc undecylenate as the operable antifungal because it has advantages, but use of such term is intended to include operable inclusion of other antifungal or antimycotic agents. Such agents are intended for dispersion in plastic dentures although the practitioner will appreciate that such agents may be placed in similar plastics for other appropriate use as in corrective orthopedic devices such as foot pads or the like used in chiropody.

Fungal growth is physically observable as "white and brown spots" which may take the form of projecting growth. Different attempts have been made to counteract the growth, one of such ways being the urging by suppliers to practitioners to practice better oral hygiene. This is clearly an undependable method of doubtful efficacy. Following reports of frequent occurrence of such spots and growths, it was found that plastic compositions prepared according to this invention successfully inhibit the formation of such spots and growths, and of course, retard the fungal growth which is the material factor. The incorporation of the antifungal agents in the highly plasticized cushions and elastomeric liners has confirmed that fungal growth is retarded, and that, in particular, zinc undecylenate is not leached out of the plastic composition.

The outstanding properties of the antifungal agents would, however, not be realized if less than effective amounts of said antifungal agents were dispersed throughout the plastic composition. It has therefore been further found that such effective amount is at least about 1% by weight of the plastic composition. In general, a minimum concentration of 1% will result in a composition which effectively retards undesirable fungal growth. This is true of cushion tight plastics containing substantial portions of plasticizers and alkyl methacrylates which are popular resins in the dental area. It is likewise true of a silicone resin elastomer which is an elastomeric used in dentures. See Sauer, J. L., 1966, Jour. Prost, Dent., 16, 650. The antifungal agents could also be incorporated in polyamide (nylon) or other elastomeric based denture materials.

The methacrylates used to form a plastic cushion are well known in the art and, for convenience, reference will herein be made to such plastics as "plasticized methacrylates." For further convenience reference will be made to the foregoing silicones as "elastomeric silicone resins." It should be understood that an effective amount may be actually a little less than 1% for some plastic compositions other than the plasticized methacrylates or elastomeric silicone resins. Even for the foregoing resins good results may be obtained below 1% on occasion, although it is never recommended to reduce the antifungal agent substantially below ½% by weight of the plastic composition. In general, good results can be expected when said antifungal agent is present at least about 1% by weight of the composition. The upper range of the antifungal agent should not be unduly increased because this leads to economical waste and may adversely affect the characteristic of the plastic composition. In general, concentration of about 5% does not lead to any particularly desirable results.

K. Lelkes, previously cited, reported that the pH of the saliva under prosthetic dentures is at lower levels, and such a low pH favors the growth of Candida albicans. It is however an advantage that this same low pH level enhances the effectiveness of the antimycotic agents, previously described, when added to the plastic compositions.

The incorporation of zinc undecylenate as the antifungal agents, of course, accomplishes its primary purpose of retarding the undesirable fungal growth but, additionally and importantly, this particular antifungal agent is highly suitable for incorporation into plastic compositions. The antifungal agent has been found not to be leached out of the plastic composition by the action of saliva or other aqueous attack. This is very important because the water in the oral cavity would first of all remove the antifungal agent and frustrate its intended purpose. Secondly, the leached out antifungal agent would in a sense leave a void which would be filled by undesirable material dissolved in the saliva. Such materials include decomposed organic matter, microorganisms and the like. These adverse materials would understandably lead to unpleasant odors, possible infections, and related undesirable occurrences. The zinc undecylinate not only fails to be leached out by the aqueous environment but, in fact, positively resists such action because it is water repellent. This advantage makes it even more adaptable and desirable for incorporation into plastic compositions used for application to dentures.

Such plastic compositions may be conventionally packaged in one or more of the many ways practiced in the packaging art. In the case of a cushion plastic, the package would separably contain the alkyl methacrylate and the plasticizer. The plasticizer would be present in sufficient amounts so that upon processing the methacrylate, the composition would become highly plasticized. Solvent could also be separably included if necessary and desired. The package would likewise contain anti-fungal agent in an amount sufficient so that when it is dispersed throughout the processed plastic composition it will be present in an amount of at least about 1% by weight. In the case of the elastomeric silicone resin, the silicone resin may be separately packaged with its curing agent or may be admixed with specialized curing agents such as anhydrous acetic acid as disclosed in U.S. Letters Patent Number 3,035,016. When such packages are opened, the ambient moisture will activate the catalyst in the silicone resin to convert it to its elastomeric state. The physical description of the various materials and separators which may be present in any package are not described since such represents common knowledge in this art and the description is not otherwise essential to the practice of this invention. It will be appreciated, however, that various paper containers with compartments may be used as well as stoppered glass or plastic bottles to hold the various materials in the package.

The package may be conveniently separated into a liquid component and a solid component. The liquid may contain a solvent, a liquid antifungal agent such as benzyl benzoate, a liquid plasticizer such as dibutyl phthalate, gel modifiers and bactericidal materials such as alcohol. The solid component may contain a polymer or copolymer resin and a solid antifungal agent such as a heavy metal salt of a monocarboxylic fatty acid. The liquid and solid components may be mixed until an appropriate gel is formed, and then applied by the practitioner to the denture. If a resilient plastic is used that requires a curing agent, it will be separately packaged, whether it is a solid or a liquid.

The following examples are presented to illustrate embodiments of the invention, but they should not be viewed as exclusive teachings.

EXAMPLE 1

(1) Liquid component

| Ingredient: | Volume, cc. | Percent |
|---|---|---|
| Benzyl benzoate | 46 | 61.3 |
| Fixed oil (corn oil) | 20 | 26.6 |
| Dibutyl phthalate | 2 | 2.6 |
| Ethyl acetate | 2 | 2.6 |
| Isopropyl alcohol, absolute | 5 | 6.6 |

(2) Solid component

| Ingredient: | Weight, gms. |
|---|---|
| Polyethylmethacrylate | 35 |
| Zinc undecylinate | 1 |

Equal volumes of components 1 and 2 (6.3 ml. liquid; 6.7 gms. powder) are mixed for about 30 seconds, whereupon the mixture forms a soft, spreadable gel. The mixture is applied to an upper denture and then placed in the mouth of a wearer. Placement in the mouth forms a soft cushion, known as a tissue conditioner, on the denture.

The benzyl benzoate ester has solvent and fungicidal properties, it has a mild aromatic odor, and is entirely non-toxic in the amounts and manner used. The ester form retains considerable fungicidal activity of that shown by the monocarboxylic acid, benzoic acid. The ester does not result in sensitization, that is, cause allergic reactions. The fixed oil is a modifier or diluting agent, particularly with respect to diluting the aromatic content of the benzyl benzoate. The useful fixed oils are the semidrying oils such as corn, cottonseed and peanut. It also has the property of retarding gel formation. The acetate type solvent operates conventionally as a solvent and has the property of accelerating gelling. The combination of the fixed oil and the acetate type solvent, such as the lower alkyl type, operate to balance the gelling rate for convenient handling. The lower alcohol is also a gelling modifier, and larger amounts of the alcohol and acetate lead to a faster gelling time. The alcohol itself has recognized bactericidal properties, and when the alcohol is applied to moist tissue, dilution enhances the bactericidal activity.

The polyethylmethacrylate can be prepared by methods well known in the art by polymerizing ethyl methacrylate monomer. The ethyl methacrylate monomer may also be combined with another monomer copolymerizable therewith according to practices well known in the art.

The liquid and solid components may contain pigments, which may be inorganic or organic dyestuffs and lakes thereof in portions generally used in this art.

The use of the phthalic acid ester plasticizers contributes to the desirable properties of the plastic because such materials, themselves, tend to resist fungal growth.

EXAMPLE 2

(1) Liquid component

| Ingredient: | Volume, cc. | Percent |
|---|---|---|
| Benzyl salicylate | 10 | 33.3 |
| Dicyclohexyl phthalate, gms | 8 | 26.6 |
| Ethyl alcohol, absolute | 10 | 33.3 |
| Caprylic acid | 2 | 66 |

(2) Solid component

| Ingredient: | Weight, gms. |
|---|---|
| Copolymer of ethylbutylmethacrylate | 35 |
| Zinc propionate | 1 |

The copolymer is a powder form of finely divided beads or spheres. The dicyclohexyl phthalate is dissolved in the liquid component. Equal parts of components 1 and 2 are mixed and applied as in Example 1. The benzyl salicylate has properties generally similar to benzyl benzoate. It is also a good solvent and plasticizer for the copolymer. Similar plastic compositions are made by successively using zinc caprylate and zinc undecylenate in place of the zinc propionate in the solid component.

EXAMPLE 3

(1) Liquid component

| Ingredient: | Volume, cc. | Percen |
|---|---|---|
| Lauryl methacrylate monomer | 17 | 46.7 |
| Polyethylene glycol dibenzoate | 17 | 46.7 |
| Undecylenic acid | 1.5 | 4.2 |
| Methyl methacrylate monomer | 1.5 | 4.2 |
| Ethyl acetate | 1.5 | 4.2 |

(2) Solid component

| Ingredient: | Weight, gms. |
|---|---|
| Polyethylmethacrylate | 35 |
| Zinc undecylenate | 1 |

One part of the liquid component is mixed with two parts of the solid component, by weight. The mixture is applied to the denture and cured by applying heat against the denture according to techniques well known in the dental art. A soft, resilient plastic having improved physical properties is obtained. Other compositions are prepared by successively using propionic, caprylic and capric acids in place of the undecylinic acid in the liquid component.

The resin mixture of the last example can be cured in the presence of well known free radical catalysts rather than applying external heat. A tertiary amine or a sulfinic acid could be added to the liquid component and a peroxide type compound could be added to the solid component to obtain such a cure. This will result in a composition which is known in the dental field as a "room temperature curing" soft, resilient resin.

It is clear from the foregoing examples that antifungal agents may be incorporated in both the liquid and solid components, and that two of such agents may be incorporated in the same resilient plastic composition. If desired, even additional agents may be placed in such compositions. Other antibacterial agents may be included, if desired, such as the alcohols.

A major problem of denture use has been fully recognized, appreciated and solved according to the teachings of the present invention. Antifungal agents will serve the purposes of the invention if they are non-toxic, esthetically non-offensive and are compatible with the plastic compositions used in the denture art. Without intending the exclusion of any operable antifungal agents, the preferred groups have been identified. The preferred monocarboxylic fatty acids are those up to medium chain length, by which is meant those inclusively extending from propionic to undecylinic. The preferred heavy metal salts are the copper and zinc salts. The preferred esters of benzoic and salicylic acid are the aromatic esters.

It will be appreciated that various other solvents and plasticizers may be used to lead to desired handling, and to obtain desired levels of plasticized methacrylates, for example.

The disclosed invention may now be practiced, and such practitioners will know that the teachings are not restricted to the embodiments actually disclosed, but should be limited only by the terms of the following claims as given further meaning by the preceding description.

I claim:

1. In a plastic composition having resins selected from the class consisting of lower alkyl methacrylates, silicone resins, vinyl copolymers, and polyamide to form liners or tissue conditioners for dentures, the improvement wherein an antifungal agent is dispersed in said resin, said antifungal agent being of the class of heavy metal salts of monocarboxylic fatty acids, up to medium chain length fatty acids, benzoic acid, benzyl benzoate, salicylic acid, and benzyl salicylate, said antifungal agent being present in said resin in an amount effective to retard fungal growth on said composition, and, said amount being at least about 1% by weight of the plastic composition.

2. In a plastic composition as in claim 1 above wherein said resin is a silicone resin processed to form an elastomeric denture liner, and said antifungal agent is zinc undecylenate present in an amount of at least 1% by weight of said plastic composition.

3. In a plastic composition as in claim 1 above wherein said resin is a lower alkyl methacrylate processed to form a soft gel tissue conditioner, and said antifungal agent is zinc undecylenate present in an amount of at least 1% by weight of said plastic composition.

4. In a plastic composition as in claim 1 above wherein said antifungal agent is zinc undecylenate.

5. In a plastic denture which retards fungal growth on said denture when placed in the mouth, said denture having a resilient resin material of the class selected from the class consisting of lower alkyl methacrylates, silicone resins, vinyl copolymers, and polyamide, the improvement wherein an antifungal agent is dispersed in said resilient resin material, said antifungal agent being of the class of heavy metal salts of moncarboxylic fatty acids, up to medium chain length fatty acids, benzoic acid, benzyl benzoate, salicylic acid, and benzyl salicylate, and said antifungal agent being present in said resilient resin material in an amount effective to retard fungal growth on said resilient resin material, said amount being at least about 1% by weight of the resilient resin material.

6. In a plastic composition as in claim 5 above wherein said resilient resin material is a lower alkyl methacrylate processed to form a soft gel tissue conditioner, and said antifungal agent is zinc undecylenate present in an amount of at least 1% by weight of said resilient resin material.

7. In a plastic composition as in claim 5 above wherein said resilient resin material is a silicone resin processed to form an elastomeric denture liner, and said antifungal agent is zinc undecylenate present in an amount of at least 1% by weight of said plastic composition.

References Cited

UNITED STATES PATENTS

| 2,490,100 | 12/1949 | Smith. |
| 2,491,287 | 12/1949 | Smith et al. |
| 3,005,720 | 10/1961 | Teller. |
| 3,096,183 | 7/1963 | Genth. |

OTHER REFERENCES

Dubos, Bacterial and Mycotic Infections of Man, 2nd ed., published by J. B. Lippincott Co., Philadelphia, 1952 p. 663.

Gibbons, Journal of the Michigan State Dental Association, vol. 47, pp. 64–67, Mar. 1965.

Richardson, Royal Canadian Dental Corps Quarterly, vol. 6, pp. 13–16, October 1965.

RICHARD L. HUFF, Primary Examiner

U.S. Cl. X.R.

260—45.7, 45.75, 45.85; 424—27, 29, 32, 39, 81, 230, 289, 294, 308, 315, 317